Patented July 21, 1931

1,815,878

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

ESTERS OF SECONDARY ALCOHOLS

No Drawing.    Application filed September 29, 1928.   Serial No. 309,365.

This invention relates to esters of secondary alcohols containing more than six carbon atoms to the molecule with dibasic organic acids. Examples illustrating the invention follow.

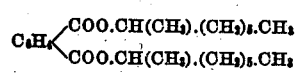

Methyl-n-hexyl-methyl phthalate.

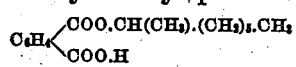

Methyl-n-hexyl-methyl hydrogen phthalate.

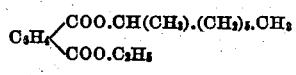

Methyl-n-hexyl-methyl ethyl phthalate.

In each of the above examples the phthalate radical,

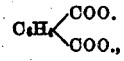

may be replaced by the succinate radical,

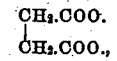

to give the corresponding succinates. Likewise, the invention includes the corresponding esters of tartaric, citric, maleic, trimesic, or other dibasic or polybasic organic acid. Also, the methyl-n-hexyl-methyl radical in the type formulas above may be substituted by radicals of other secondary aliphatic alcohols that contain more than six carbon atoms to the molecule, as, for example, methyl-n-amyl-carbinol, methyl-isoamyl-carbinol, ethyl-n-butyl-carbinol, ethyl-isobutyl-carbinol, methyl-isohexyl-carbinol, ethyl-n-amyl-carbinol, ethyl-isoamyl-carbinol, propyl-n-butyl-carbinol, propyl-isobutyl-carbinol, isopropyl-isobutyl-carbinol, methyl-n-heptyl-carbinol or other secondary nonyl alcohol, or methyl-n-octyl-carbinol or other secondary decyl alcohol. Also, the ethyl radical shown in the formula above may be replaced by another akyl group, as, for example, methyl, propyl, isopropyl, butyl, secondary butyl, amyl, or isoamyl.

The examples above are given for the purpose of illustration and not limitation of the invention. The invention comprises the acid or neutral esters of a polybasic organic acid in which the hydrogen of at least one carboxyl group has been replaced by the radical of a secondary aliphatic alcohol that contains more than six carbon atoms to the molecule.

To prepare the neutral esters one may esterify the polybasic acid with an excess of the alcohol.

Examples illustrating methods of preparation follow.

A mixture of 4 parts by weight of succinic acid, 13 of methyl-n-hexyl-carbinol, 20 of toluol, and ½ of sulfuric acid is submitted to fractionation for a period of 5 hours, the toluol layer of the condensate being returned substantially continuously to the still in order to remove from the still the water formed by the interaction of the acid and the alcohol. The mixture remaining in the still after 5 hours is neutralized by thoroughly agitating with 2 parts of soda ash dissolved in 20 of water, allowing the mixture to stand, and then drawing off the lower layer that forms. After being washed with 40 parts of water, in 2 portions, the oil layer is distilled to remove the toluol and excess of methyl-n-hexyl-carbinol. The remaining oil comprises methyl-n-hexyl-methyl succinate,

On fractional distillation it boils at 228° C. at a pressure equal approximately to 26 mm. of mercury. This compound is an oily liquid. It is useful as a solvent for certain resins and oils. Also, it is a colloiding agent for pyroxylin with which it may be used as a plasticizer in lacquer and other compositions.

In another preparation, ortho-phthalic acid was substituted for the succinic in the above example. The resulting methyl-n-hexyl-methyl phthalate boiled at a temperature above 210° C. at 3 mm. This compound also is useful as a solvent for certain resins and oils. It is substantially non-volatile at atmospheric temperatures. It is a slowly acting solvent for pyroxylin.

Lacquers may be made that comprise pyroxylin, ester gum or dammar, volatile solvents and diluents, and the neutral ester of methyl-n-hexyl-carbinol with either succinic or phthalic acid.

In the above preparations, there may be substituted a mixture comprising secondary alcohols prepared from olefin hydrocarbons present in cracked petroleum. As a source of these olefins I find suitable the fraction of cracked petroleum that distills at 40 to 140° C. I find suitable also the material obtained by subjecting petroleum to cracking at a relatively high temperature, so called "vapor-phase" cracking, and fractionating, from the product, compounds of boiling point not above 140° C., at atmospheric pressure. The conversion of liquid olefins, of boiling point below 140° C., in a fraction of cracked petroleum, to the corresponding alcohols may be made by well known methods, as, for example, by treatment with sulfuric acid, dilution with water, distillation, and, finally, fractionation of the oil layer of the distillate to give a fraction distilling below 140° C. that consists chiefly of hydrocarbons and one distilling above 140° C. that comprises most of the alcohols formed. In these higher alcohols, some methyl-n-hexyl-carbinol is present.

To make an acid ester, there may be used a deficiency of the alcohol as compared to the organic acid, for example, one molecular proportion of a dibasic acid and one molecular proportion of the alcohol, in the presence of an acid cataylst. A mixed ester may be made, for example, by first preparing an acid ester, as above, and then adding another alcohol, esterfying, neutralizing, and distilling. In such a way, one makes an ester containing the radicals of more than one alcohol.

The above examples illustrate methods of preparing some of the compounds of my invention. Many details may be varied or other entirely different processes of preparation may be used without departing from the spirit of the invention. Thus, for example, one may reflux a solution comprising the sodium or potassium salt of a polybasic acid with a secondary alkyl chloride, said alkyl group containing more than 6 carbon atoms to the molecule.

An alcohol "that does not contain a branched chain structure", as used in the claims, is intended to mean an alcohol of the type

CH₃.CHOH.(CH₂)₄.CH₃ as distinguished from the type

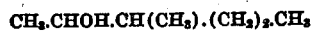
CH₃.CHOH.CH(CH₃).(CH₂)₂.CH₃ or

CH₃.CHOH.(CH₂)₂.CH(CH₃)₂

In the "branched chain type" at least one of the alkyl group joined to the .CHOH. group is an isoalkyl radical.

I claim:

1. A composition of matter comprising an ester of a polybasic organic acid with a secondary, aliphatic alcohol that contains more than six carbon atoms to the molecule.

2. A composition of matter comprising an ester of a polybasic aliphatic acid with a monohydric aliphatic secondary alcohol that contains more than six carbon atoms to the molecule.

3. A composition of matter comprising an ester of a polybasic organic acid with methyl-n-hexyl-carbinol.

4. A composition of matter comprising an ester of a dibasic organic acid with a secondary, aliphatic alcohol that contains more than six carbon atoms to the molecule.

5. A composition of matter comprising an ester of a dibasic aliphatic acid with a monohydric aliphatic secondary alcohol that contains more than six carbon atoms to the molecule.

6. A composition of matter comprising an ester of succinic acid with a monohydric aliphatic secondary alcohol that contains more than six carbon atoms to the molecule.

7. A composition of matter comprising an ester of a dibasic organic acid with a monohydric aliphatic secondary alcohol that contains more than six carbon atoms to the molecule and that does not contain a branched chain structure.

8. A composition of matter comprising an ester of a dibasic organic acid with methyl-n-hexyl-carbinol.

9. Methyl-n-hexyl-methyl succinate.

10. A composition of matter comprising esters of a dibasic organic acid with the mixture of alcohols corresponding to the olefins of a fraction of cracked gasoline that boils below 140° C.

11. A composition of matter comprising esters of a dibasic aliphatic acid with the mixture of alcohols corresponding to the olefins of a fraction of cracked gasoline that boils below 140° C.

12. A composition of matter comprising esters of succinic acid with the mixture of alcohols corresponding to the olefins of a fraction of cracked gasoline that boils below 140° C.

13. The esters of a dibasic acid with alcohols corresponding to liquid olefins boiling at 40 to 100° C., said olefins being derived from a petroleum that has been submitted to "vapor-phase" cracking.

14. A composition of matter comprising the grouping of atoms represented by the formula

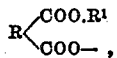

in which R represents a bivalent radical comprising carbon and hydrogen atoms and R¹ represents the radical of a secondary, aliphatic alcohol containing more than six carbon atoms to the molecule.

15. A composition of matter comprising the grouping of atoms represented by the formula

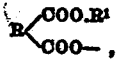

in which R represents a bivalent radical comprising carbon and hydrogen atoms and $R^1$ represents the radical of methyl-n-hexyl-carbinol.

16. A composition of matter comprising the grouping of atoms represented by the formula

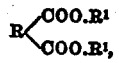

in which R represents a bivalent radical containing carbon and hydrogen and $R^1$ represents the radical of a secondary, aliphatic alcohol that contains more than six carbon atoms to the molecule.

17. A composition of matter comprising the grouping of atoms represented by the formula

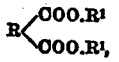

in which R represents a bivalent radical containing carbon and hydrogen and $R^1$ represents the radical of a monohydric aliphatic secondary alcohol that contains more than six carbon atoms to the molecule and that does not contain a branched chain structure.

18. A composition of matter comprising the grouping of atoms represented by the formula

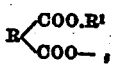

in which R stands for a bivalent radical containing only carbon and hydrogen and $R^1$ stands for the radical of a secondary, aliphatic alcohol that contains more than six carbon atoms to the molecule.

ROBERT H. VAN SCHAACK, Jr.